Figure 1:
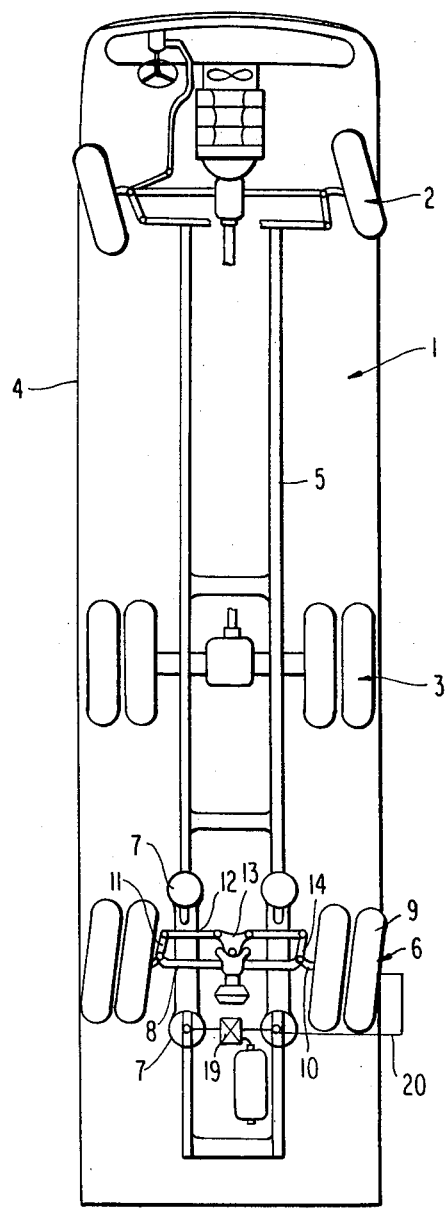

United States Patent [19]

Strifler et al.

[11] 4,449,726

[45] May 22, 1984

[54] CONTROL FOR FOLLOW-UP STEERING AXLES

[75] Inventors: Paul Strifler, Dettingen; Heinrich Geissler; Dieter Lüdtke, both of Stuttgart; Rudolf Maurath, Esslingen; Rudolf Steinecke, Weinstadt, all of Fed. Rep. of Germany

[73] Assignee: Daimler-Benz Aktiengesellschaft, Fed. Rep. of Germany

[21] Appl. No.: 491,451

[22] Filed: May 4, 1983

Related U.S. Application Data

[63] Continuation of Ser. No. 186,645, Sep. 12, 1980, abandoned.

[30] Foreign Application Priority Data

Sep. 12, 1979 [DE]  Fed. Rep. of Germany ....... 2936766

[51] Int. Cl.³ .............................................. B62D 9/00
[52] U.S. Cl. ..................................... 280/81 A; 280/94
[58] Field of Search ............. 180/141, 143; 280/81 A, 280/94, 426, 443, 460 R, 432, 446 R

[56] References Cited

U.S. PATENT DOCUMENTS

| | | | |
|---|---|---|---|
| 3,403,925 | 10/1968 | Sauer | 280/81 A |
| 3,583,515 | 6/1971 | Schwenk | 280/94 |
| 3,656,776 | 4/1972 | Steiner | 280/81 A |
| 3,825,281 | 7/1974 | Howard | 280/423 R |
| 4,162,082 | 7/1979 | Curry | 280/81 A |

FOREIGN PATENT DOCUMENTS

| | | | |
|---|---|---|---|
| 2351841 | 12/1977 | France | 180/143 |
| 532194 | 8/1955 | Italy | 280/81 A |

Primary Examiner—Joseph F. Peters, Jr.
Assistant Examiner—Ross Weaver
Attorney, Agent, or Firm—Craig & Burns

[57] ABSTRACT

A control arrangement for a follow-up steering axle in single- or multiple-unit vehicles with at least three axles. The follow-up steering axle may be stabilized in dependence upon a load of the vehicle in a direction toward a straight-ahead driving position and may be blocked in the straight-ahead driving position. A speed-dependent stabilization is provided for the follow-up steering axle in a direction toward its straight-ahead driving position.

9 Claims, 3 Drawing Figures

U.S. Patent   May 22, 1984   4,449,726

CONTROL FOR FOLLOW-UP STEERING AXLES

This is a continuation of application Ser. No. 186,645, filed Sept. 12, 1980, now abandoned.

The present invention relates to a control arrangement and, more particularly, to a control for a follow-up of trailing steerable axles in single or multiple unit vehicles which are provided with at least three axles, wherein the follow-up steering axle, in particular, may be stabilized in dependence upon a load in a direction toward a straight-ahead driving position and may be blocked or locked in such straight-ahead driving position.

Follow-up steering axles are employed in single unit vehicles behind the driving axle of the motor vehicle in multiple unit vehicles such as axles for trailers. A form of usage especially of interest herein is, insofar, the use of a front axle for a trailer, the drawbar of which is rotationally fixably connected in a horizontal direction with a tractor of a multiple-unit vehicle, wherein the drawbar fulcrum with respect to the trailer lies in a zone of the follow-up steering axle.

In connection with follow-up steering axles, it has been proposed to equip the same with a device for steering stabilization in order to avoid steering irregularities and also to promote resetting of the wheels into a straight-ahead driving position. In this connection, stabilization would take place in dependence upon a load. It has also been proposed to block or lock the steering device in order to enable a reverse and maneuvering driving operation of the vehicle.

As long as the spacing of the follow-up steering axle with respect to the axle arranged in front thereof, that is, for example, the driving axle of a trailer, remains within customary limits, the above-proposed stabilization arrangement proves suitable in conjunctions with fields of usage of interest herein. In other words, as long as the follow-up steering axle is located at a relatively small distance behind the driving axle, such stabilization would be suitable. In this connection, the spacing is customarily only a little larger than a wheel diameter at the driving axle or at the follow-up steering axle.

However, the driving characteristics are no longer satisfactory when, in particular, there is a larger spacing between the follow-up steering axle with respect to the axle arranged in front thereof. Such larger spacing especially results in a special field of use, namely, when employing the follow-up steering axle as a front axle for a trailer which trailer is coupled through its drawbar, blocked or locked against pivoting, to the truck, tractor or hauling vehicle. In this arrangement, the above-proposed follow-up steering axle with load dependent stabilization is unsatisfactory since especially at higher speeds there occurs considerable oversteering tendencies which can hardly be controlled.

The aim underlying the present invention essentially resides in providing a control for follow-up steering axles which provides a balanced driving characteristic of the vehicle even in situations wherein there is a large spacing between the follow-up steering axle and associated guiding axle.

In accordance with advantageous features of the present invention, the follow-up steering axle is stabilized in dependence upon a speed of the vehicle in a direction toward its straight-ahead driving position, namely, with a restoring force toward the straight-ahead driving position which increases over the speed.

By virtue of this arrangement, it has been found that oversteering tendencies are avoided and driving characteristics are obtained, even in connection with multiple unit vehicles of the aforementioned type, which may be considered extensively neutral.

Moreover, it is even possible in accordance with the above-noted features of the present invention to superimpose certain understeering tendencies so that the vehicle, be it a single or multiple unit-type, exhibits a tendency to the same driving characteristics as a conventional two-axle or three-axle truck even with a large distance between the trail axle and guide axle disposed in front thereof. However, this is of great significance under practical operating conditions because it is difficult for a driver to adapt himself, without transition, to vehicles having a contrasting driving characteristic. However, such adaptation would be necessary if, for example, the truck or tractor as such would exhibit an entirely different driving behavior from that of the unit consisting of a truck and trailer.

In order to maintain the steering expenditure at a minimum, in accordance with the present invention, it is advantageous to raise the restoring force over the speed of the vehicle in stages and, preferably, an especially simple solution resides in that the follow-up steering axle is automatically blocked above a predetermined limiting speed in a straight-ahead driving position. In this connection, advantageously, the speed limit lies suitably in a range of between 30 km and 50 km and is preferably at about 35 km per hour. The blocking may be respectively engaged only in a straight-ahead driving position, namely, in accordance with the present invention, preferably with a time delay regarding the attainment of the straight-ahead driving position.

Accordingly, it is an object of the present invention to provide a control arrangement for follow-up steerable axles which avoids, by simple means, shortcomings and disadvantages encountered in the prior art.

Another object of the present invention resides in providing a control arrangement for follow-up steerable axles which provides for a balanced driving characteristic of the vehicle.

Yet another object of the present invention resides in providing a control arrangement for follow-up steerable axles wherein the stabilizing of the follow-up axle is effected in dependence upon a speed of the vehicle.

A further object of the present invention resides in providing a control arrangement for follow-up steerable axles which automatically blocks the steerable axle in a straight-ahead driving position when the vehicle exceeds a predetermined limiting speed.

Yet another object of the present invention resides in providing a control arrangement for follow-up steerable axles which minimizes if not avoids any oversteering tendencies.

A further object of the present invention resides in providing a control arrangement for follow-up steerable axles which functions reliably under all operating conditions.

Yet another object of the present invention resides in providing a control arrangement for follow-up steerable axles which is simple in construction and therefore relatively inexpensive to manufacture.

Figure 2:
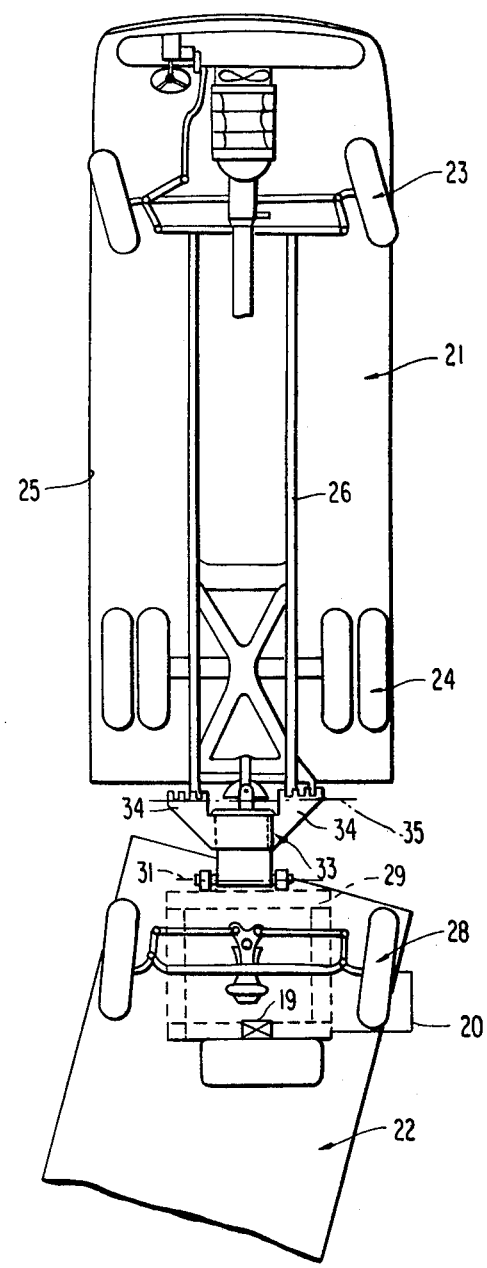
Figure 1A:
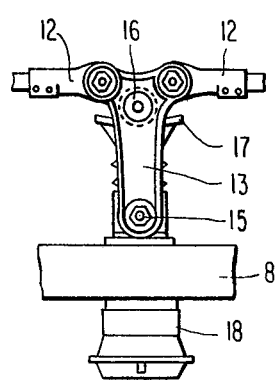

These and other objects, features and advantages of the present invention will become more apparent from the following description when taken in connection with the accompanying drawings which show, for the purpose of illustration only, one embodiment in accordance with the present invention, and wherein:

FIG. 1 is a partially schematic top view of a single unit vehicle provided with the control arrangement of the present invention, in the form of a truck, equipped as a three-axle vehicle with a follow-up steering axle offset toward a rear with respect to a driving axle of the vehicle;

FIG. 1a is a partial enlarged detailed view of the control arrangement of FIG. 1; and FIG. 2 is a partially schematic top view of a multiple unit vehicle provided with the control arrangement of the present invention, with the vehicle being in the form of a tractor and a trailer, when a drawbar of the trailer is coupled with the tractor so that it cannot be pivoted horizontally, and a front axle of the trailer is formed by a follow-up steering axle.

Referring now to the drawings when like reference numerals are used throughout the several views to designate like parts and, more particularly, to FIG. 1, according to this figure, a single unit vehicle in the form of a three-axle truck generally designated by the reference numeral 1 includes a steerable front axle generally designated by the reference numeral 2 and a rear driving axle generally designated by the reference numeral 3. A body 4 of the truck 1, carried by way of a frame 5, has a relatively large overhang with respect to the driving axle 3 and is supported in a zone of the overhang by way of a follow-up steering axle generally designed by the reference numeral 6, to be described more fully hereinafter.

The follow-up steering axle 6 is arranged at a relatively large spacing with respect to the driving axle 3 and, in the illustrated embodiment of FIG. 1, such spacing is a multiple of the wheel diameter of the driving axle 3 or the follow-up steering axle 6. Numerically, the distance or spacing between the driving axle 3 and the follow-up steering axle 6 corresponds approximately to two to three times the above-noted wheel diameter.

The illustrated follow-up steering axle 6 is formed as a pneumatic suspension axle assembly which includes air cushion cylinders 7. However, it is also possible in accordance with the present invention to use other types of suspension for the axle assemblies. Moreover, the follow-up steering axle 6, in the illustrated embodiment, provides tandem or twin tires; however, single tires may also be provided on the follow-up steering axle 6.

Steering stubs or knuckles 10, pivotable about upright axes, serve, in a conventional manner, for mounting tires 9 to both sides of an axle body 8 of the follow-up steering axle 6. Pitman arms 11 are connected to the steering stubs or knuckles 10, with the pitman arms 11, in turn, being respectively articulated to a bell crank 13 through a tie rod 12. The bell crank 13, in turn, is mounted to be pivotable about an upright axis to a part fixedly joined to the axle, in a manner not shown in detail in the drawings. The wheels or tires 9 associated with the two axle sides are thus coupled together with respect to their pivotability, whereby a position of the pivot axis of the steering stubs or knuckles 10, displaced toward a front with respect to centers of the wheels or tires 9, results in a self-tracking behavior, i.e., a tea-cart caster effect. The pivot axles of the wheels or tires 9 and/or of the steering stubs or knuckles 10 carrying the same are designated by the reference numeral 14.

As shown most clearly in FIG. 1a, the bell crank 13 is, in turn, horizontally pivotable about an upright swivel axis 15 with respect to the axle body 8 and carries a sliding roller 16 cooperable with a guide track 17. The guide track 17 is associated with an axially displaceably diaphragm cylinder 18 which cylinder 18 may, for example, be selectively exposed to compressed air supplied from a compressed air source (not shown). The guide track 17 is curved in a direction opposite to a pivoting path of the bell crank 13 so that, based upon a predetermined pressure of the compressed air in the diaphragm cylinder 18, a supporting action ensues which increases with an increasing steering lock angle.

In view of varying loading conditions of the truck 1, the compressed air acts on the diaphragm cylinder 18 initially in dependence upon a load in such a way that, with an increasing load, the pressure increases in the diaphragm cylinder 18. As a consequence of such action, a steering stabilization results with an increasing load, that is, an enhanced restoration to a straight-ahead driving position. Furthermore, a speed-dependent steering stabilization is provided according to the present invention and is achieved by the fact that the pressure in the diaphragm cylinder 18 is increased in dependence upon the speed, with increasing velocity. The consequence of such a speed-dependent control is that smaller steering angles result than in the case of a free caster, up to transverse forces occurring during normal driving along a curve. Correspondingly, the truck 1 attains an understeering driving behavior through the follow-up steering axle 6. Since relatively large transverse forces, as they occur while the truck 1 is traversing sharp curves, also arise only at relatively small speeds, the respective steering angle becomes larger for smaller speeds, so that curve-handling ability of the truck 1 is correspondingly improved at low speeds.

Consequently, in accordance with the present invention, a stabilizing behavior in dependence upon the speed is imparted to the steering stabilization, increasing toward a limit speed and leading, if the predetermined limit speed is exceeded, to a blockage or locking of the steering axle 6 in a straight-ahead driving position. The speed-dependent stabilization may also be restricted in accordance with the present invention, to effecting a blocking or locking of the steering axle 6 in its straight-ahead driving position merely at a predetermined speed limit. Below this speed limit, the stabilizing characteristic is not affected in dependence upon speed and, in the illustrated embodiment of FIGS. 1 and 1a, which is the simplest in its practical realization, and therefore results merely from a preferably additionally provided, load-dependent stabilization. Such a load-dependent stabilization is intended within the purview of the present invention, particularly in the case of vehicles having a small total weight substantially dependent upon the load, while it is possible, in the case of vehicles having a substantially constant total weight, to operate instead also with a constant stabilization.

The speed-dependent control takes place through a pressure-modulating device 19, of a conventional construction, which is inserted in the compressed air supply of the diaphragm cylinder 18. The speed of the vehicle may be tapped, in accordance with the present invention, at a tachometer shaft, at an output of the transmission, or also on a side of the wheel, optionally at the follow-up steering axle. A detector or pickup device for detecting the speed is schematically illustrated and designated by the reference numeral 20 in FIG. 1.

FIG. 2 provides an example of a multiple-unit vehicle having the control arrangement of the present invention incorporated therein. More particularly, as shown in FIG. 2, a tractor generally designated by the reference numeral 21, constituted by a truck, and a trailer generally designated by the reference numeral 22 are provided, with the tractor 21 being constructed, in the illustrated embodiment, as a two-axle vehicle and including a steered front axle generally designated by the reference numeral 23 and a rear driving axle generally designated by the reference numeral 24. The rear driving axle 24 lies in close proximity to a rearward end of a body 25 carried by way of a frame 26 of the tractor 21. The frame 26 is extended to a rear end of the body 25 and reinforced by way of a cross brace 27 in a rearward zone of the frame.

The trailer 22 is constructed as a drawbar-type trailer and includes, as a front axle, a follow-up steering axle generally designated by the reference numeral 28. The follow-up steering axle 28 corresponds to the follow-up steering axle 6 described hereinabove in connection with FIG. 1 and, consequently, the other details of the follow-up steering axle 28 correspond to the details described hereinabove in connection with FIGS. 1 and 1a.

As shown in FIG. 2, the follow-up steering axle 28 is arranged at the trailer 22 so that it is pivotable about a vertical axis lying in a zone of the follow-up steering axle 28, with the pivotable arrangement being effected through a ring mount (not shown) in a conventional manner. On an axle side, the ring mount is attached to a frame 29 associated with the steering axle 28. A drawbar 30 is mounted so as to be pivotable about a horizontal axis 31 to the front end of the frame. The drawbar 30 is connected to the tractor 21 through a conventional trailer coupling 32 provided at the end of the frame 26. The universal pivotability of the drawbar 30 provided actually by the connection between the trailer coupling 32 and drawbar 30 is blocked with regard to the pivotability of the drawbar 30 in a transverse direction of the vehicle 21 so that a unit results which is rigid in the transverse direction of the vehicle 21 between the follow-up steering axle 28 and tractor 21, leading to relationships regarding the driving technique for the tractor 21 and follow-up steering axle 28 which correspond to those described hereinabove in connection with the truck 1 of FIG. 1.

In the arrangement of FIG. 2, the blocking of the movability of the drawbar 30 regarding the transverse pivotability with respect to the tractor 21 may be accomplished, for example, by a cowl generally designated by the reference numeral 33 in which the neck of the drawbar 30 is guided so as to be unyieldable in a transverse direction. The cowl 33, in turn, is articulated by two lateral arms 34 to the frame 26 of the tractor 21 so as to be pivotable about a horizontal axis 35. The horizontal axis 35 extends approximately through a point of articulation of the trailer coupling 32, so that the vertical pivotability of the drawbar 30 is not impaired or impeded.

For the sake of simplicity, the speed-dependent control for the embodiment illustrated in FIG. 2 is merely schematically illustrated by a connection 20 leading from a pressure-modulating device 19 to one of the wheels of the follow-up steering axle 28.

In accordance with the present invention, the blockage or locking of the follow-up steering axle 6 or 28 above the predetermined speed limit is accomplished without substantial additional expenditure by engaging the blockage or lock-up means when the vehicle 1 or 21 is backed up, that is, by blocking or locking the axles 6 or 28 in a straight-ahead driving position for enabling the vehicle 1 or 21 to execute a reversing or backing-up maneuver.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such changes and modifications as are encompassed by the scope of the appended claims.

We claim:

1. A control arrangement for a follow-up steering axle of a motor vehicle, wherein means are provided for stabilizing the follow-up steering axle in a direction of a straight-ahead driving position in dependence upon a speed and a load of the motor vehicle,
   the motor vehicle is at least a single-unit motor vehicle including at least three axles, and characterized in that
   said means are capable of locking the follow-up steering axle in the straight-ahead driving position.

2. A control arrangement according to claim 1, characterized in that the motor vehicle is a multiple-unit vehicle including at least three axles.

3. A control arrangement according to claim 1, characterized in that the speed-dependent stabilization of the follow-up steering axle may be additionally applied in at least one stage.

4. A control arrangement according to claim 1, characterized in that the follow-up steering axle is automatically locked in a straight-ahead driving position upon the vehicle exceeding a predetermined speed limit.

5. A control arrangement according to claim 1, characterized in that the follow-up steering axle may be locked merely in the straight-ahead driving position in dependence upon the speed of the vehicle.

6. A control arrangement according to claim 1, characterized in that the follow-up steering axle includes means for mounting at least one wheel on a respective side of the axle, and means for connecting the mounting means of the respective wheels to one another so as to be pivotable in unison about a vertically extending axis, and in that the means for stabilizing the follow-up steering axle in dependence upon the speed of the motor vehicle includes a pneumatic cylinder means adapted to act upon the connecting means for providing a supporting action on the connecting means.

7. A control arrangement according to claim 6, characterized in that the mounting means includes a steering knuckle arranged at respective sides of the follow-up steering axle, the connecting means includes a bell crank means pivotally mounted to the follow-up steering axle, and tie rod means for connecting the respective steering knuckles to the bell crank means, and in that the means for stabilizing the follow-up axle in dependence upon the speed of the motor vehicle further includes a means for increasing a pressure supplied to the pneumatic cylinder means in dependence upon a speed of the motor vehicle.

8. A control arrangement according to claim 7, characterized in that the pneumatic cylinder means further includes a guide track having a curve which is opposed to a pivoting path of the bell crank, and in that a sliding roller means is provided on the axle body, said sliding roller being adapted to cooperate with the guide track.

9. A control arrangement according to claim 8, characterized in that the means for increasing a pressure supplied to the pneumatic cylinder means includes a pressure-modulating device interposed between the pneumatic cylinder means and a pressure supply means.

* * * * *